(12) United States Patent
Sakamoto

(10) Patent No.: US 6,307,608 B1
(45) Date of Patent: Oct. 23, 2001

(54) LIQUID CRYSTAL DISPLAY HAVING WIDE VIEWING ANGLE RANGE

(75) Inventor: Katsuhito Sakamoto, Sagamihara (JP)

(73) Assignee: Casio Computer Co., Ltd., Tokyo (JP)

(\*) Notice: Subject to any disclaimer, the term of this patent is extended or adjusted under 35 U.S.C. 154(b) by 0 days.

(21) Appl. No.: 09/606,055

(22) Filed: Jun. 28, 2000

(30) Foreign Application Priority Data

Jun. 30, 1999 (JP) .................................................. 11-185974

(51) Int. Cl.$^7$ ................................................ G02F 1/1335
(52) U.S. Cl. ........................... 349/119; 349/117; 349/118
(58) Field of Search ................................... 349/117, 118, 349/119

(56) References Cited

U.S. PATENT DOCUMENTS

| | | | |
|---|---|---|---|
| 5,448,386 | * | 9/1995 | Watanabe et al. ...................... 359/73 |
| 5,767,937 | * | 6/1998 | Sumiyoshi ............................ 349/119 |
| 5,895,106 | * | 4/1999 | VanderPloeg et al. .............. 349/120 |
| 6,034,754 | * | 3/2000 | Sato et al. ............................ 349/102 |
| 6,034,755 | * | 3/2000 | Watanabe ............................. 349/118 |
| 6,057,901 | * | 5/2000 | Xu ........................................ 349/121 |
| 6,064,457 | * | 5/2000 | Aminaka ................................ 349/117 |
| 6,163,354 | * | 12/2000 | Yamahara et al. ................... 349/117 |
| 6,208,396 | * | 3/2001 | Shimizu et al. ...................... 349/119 |

\* cited by examiner

Primary Examiner—William L. Sikes
Assistant Examiner—Tarifur R. Chowdhury
(74) Attorney, Agent, or Firm—Frishauf, Holtz, Goodman, Langer & Chick, P.C.

(57) ABSTRACT

In a liquid crystal display having a wide viewing angle range, first and second retardation films each having negative optical anisotropy in which the refractive index in the axial direction tilted in a predetermined direction with respect to the normal line to the film plane are inserted between a liquid crystal cell including a pair of substrates and a front polarizer and between the liquid crystal cell and a rear polarizer, respectively, such that the direction components along the film planes of the axial directions are set along the aligning treatment directions of the liquid crystal cell. A third retardation film having refractive index anisotropy in the film plane is arranged between the first retardation film and the adjacent front polarizer such that the maximum refractive index direction in the film plane becomes parallel or perpendicular to the absorption axis of the front polarizer. The retardation difference generated by light that becomes incident on the liquid crystal display obliquely with respect to the normal direction is compensated by the third retardation film. Residual retardation in liquid crystal molecules near the substrate of the liquid crystal layer is compensated by the first and second retardation films. Hence, high-contrast display at a wide viewing angle can be obtained independently of the incident angle.

14 Claims, 11 Drawing Sheets

LIQUID CRYSTAL DISPLAY HAVING WIDE VIEWING ANGLE RANGE

CROSS-REFERENCE TO RELATED APPLICATIONS

This application is based upon and claims the benefit of priority from the prior Japanese Patent Application No. 11-185974, filed Jun. 30, 1999, the entire contents of which are incorporated herein by reference.

BACKGROUND OF THE INVENTION

The present invention relates to a liquid crystal display having a wide viewing angle range.

Conventional liquid crystal displays generally use TN (Twisted Nematic) or STN (Super Twisted Nematic) type apparatuses.

Each of these liquid crystal displays comprises a liquid crystal cell having a liquid crystal layer in which liquid crystal molecules are twisted at a predetermined twist angle between a pair of transparent substrates on the front and rear sides, each of which has a transparent electrode on its inner surface, and front and rear polarizers sandwiching the liquid crystal cell.

However, the TN- or STN-type liquid crystal display has a narrow observation angle range, i.e., viewing angle in which display with satisfactory contrast can be observed.

More specifically, in the conventional TN-type liquid crystal display, light obliquely incident on the liquid crystal display with respect to light incident from the normal direction has an optical path length through the liquid crystal layer, which changes depending on the incident angle. For this reason, retardation corresponding to the incident angle occurs, and the transmittance changes depending on the direction of light incidence, i.e., the observation direction. Hence, the observation angle range, i.e., viewing angle in which display with satisfactory contrast can be observed becomes narrow, and the display suffers color tinge.

BRIEF SUMMARY OF THE INVENTION

It is an object of the present invention to provide a liquid crystal display capable of obtaining a wide viewing angle.

In order to achieve the above object, according to the first aspect of the present invention, there is provided a liquid crystal display comprising:

a liquid crystal cell having alignment films formed on opposing surfaces of a pair of front and rear substrates having electrodes formed on inner surfaces, respectively, so as to be aligned in predetermined directions, and a liquid crystal layer provided between the pair of substrates;

a pair of polarizers arranged on the front side as an observation side of the liquid crystal cell and the rear side as an opposing side, respectively, so as to have absorption axes making predetermined angles with aligning treatment directions of the alignment films formed on the adjacent substrates;

a first retardation film inserted between the liquid crystal cell and the polarizer on the front side of the liquid crystal cell so as to have an axial direction, in which a refractive index is minimized, in a direction tilted in a predetermined direction with respect to a normal line to a film plane, and a direction component along the film plane in the axial direction, which is set along the direction of the aligning treatment of the alignment film formed on the substrate on the front side of the liquid crystal cell;

a second retardation film inserted between the liquid crystal cell and the polarizer on the rear side of the liquid crystal cell so as to have an axial direction, in which a refractive index is minimized, in a direction tilted in a predetermined direction with respect to a normal line to a film plane, and a direction component along the film plane in the axial direction, which is set along the direction of the aligning treatment of the alignment film formed on the substrate on the rear side of the liquid crystal cell; and a third retardation film having refractive index anisotropy in a film plane and inserted to at least one of a position between the first retardation film and the front polarizer and a position between the second retardation film and the rear polarizer so as to have a direction in which a refractive index in the film plane is maximized is substantially parallel or perpendicular to the absorption axis of the adjacent polarizer.

According to the liquid crystal display of the first aspect of the present invention, when a voltage is applied to the electrodes sandwiching the liquid crystal layer, residual retardation generated due to the influence of liquid crystal molecules which are not sufficiently aligned in the application direction near the front and rear substrates of the liquid crystal layer is compensated by the first and second retardation films, and the retardation difference that changes depending on the incident angle when light that has passed through one of the polarizers passes through the liquid crystal layer is compensated by the third retardation film.

Hence, the liquid crystal display of the present invention can realize bright display and dark display within a wide viewing angle range and can also realize display with high contrast as the ratio of the maximum transmittance to the minimum transmittance.

In the liquid crystal display of the present invention, each of the first and second retardation films comprises a discotic liquid crystal layer in which liquid crystal molecules are aligned to gradually rise from an aligned state along one surface, from one surface toward the other surface of the first or second retardation film, and has the axial direction, in which the refractive index is minimized, in a direction along an average molecular axis direction of discotic liquid crystal molecules in an intermediate direction in a direction of thickness of the discotic liquid crystal layer, and the direction component along the film plane in the axial direction of each of the first and second retardation films is set parallel to the direction of the aligning treatment of the corresponding adjacent substrate.

According to this liquid crystal display, the discotic liquid crystal layers of the first and second retardation films can compensate residual retardation due to the liquid crystal molecules near the front and rear substrates.

In the liquid crystal display of the present invention, the liquid crystal cell in which the direction of aligning treatment of the alignment film formed on the front substrate is perpendicular to that of the alignment film formed on the rear substrate has the twisted liquid crystal layer sandwiched by the substrate, the pair of polarizers have the absorption axes parallel to the direction of aligning treatment of the alignment films formed on the adjacent substrates of the liquid crystal cell; and the third retardation film has the direction in which the refractive index in the film plane is maximized in substantially parallel to the absorption axis of the adjacent polarizer.

According to this liquid crystal display, when light that has passed through one of the polarizers passes through the liquid crystal layer, the retardation difference due to the difference in incident angle is compensated by the third retardation film, so the transmittance does not change depending on the incident angle. In addition, when a voltage is applied to the electrodes sandwiching the liquid crystal layer, the first retardation film compensates residual retardation due to the alignment of liquid crystal molecules near the front substrate, and the second retardation film compensates residual retardation due to the alignment of liquid crystal molecules near the rear substrate. Hence, a decrease in contrast due to the residual retardation can be prevented.

More specifically, retardation of light that becomes incident on the liquid crystal layer obliquely with respect to the normal direction to the liquid crystal cell is different from that of light incident in the normal direction. When this retardation difference is almost canceled by refractive index anisotropy in the film plane of the third retardation film when the light passes through the film, the retardation difference generated when the light passes through the liquid crystal layer can be compensated.

Hence, irrespective of the incident angle, when a voltage is applied to the electrodes, the light that has passed through the rear polarizer is polarized to oscillate in a direction almost parallel to the absorption axis of the front polarizer, so the light is absorbed. When no voltage is applied to the electrodes, the light is polarized to oscillate in a direction perpendicular to the absorption axis of the front polarizer, so the light can pass through the front polarizer.

Additionally, when a voltage is applied to the electrodes sandwiching the liquid crystal layer, the first and second retardation films compensate residual retardation in liquid crystal molecules aligned along the substrate surfaces near the substrates, excluding the intermediate portion of the liquid crystal layer, where the liquid crystal molecules are aligned in the application direction. Light incident from one of the polarizers passes through the first and second retardation films while remaining the linearly polarized and is absorbed by the absorption axis of the other polarizer, so the display becomes dark.

Hence, in the liquid crystal display of the present invention, since the retardation difference in the liquid crystal layer due to the difference in incident angle to the liquid crystal cell or residual retardation generated by the liquid crystal molecules in the part of the liquid crystal layer near the substrates when a voltage is applied is compensated, a change in transmittance due to the difference in incident angle to the liquid crystal cell is minimum. In addition, since the transmittance can be satisfactorily controlled by controlling the voltage to be applied to the liquid crystal layer, the contrast as the ratio of the maximum transmittance to the minimum transmittance can be improved within a wide viewing angle range.

The third retardation film is preferably inserted to at least one of a portion between the front polarizer and the first retardation film and a portion between the rear polarizer and the second retardation film.

For the third retardation film, if an s-axis represents the direction in which the refractive index is maximized in the film plane, an f-axis represents a direction perpendicular to the s-axis in the film plane, and a z-axis represents a normal direction to the film plane, letting ns be a refractive index along the s-axis, nf be a refractive index along the f-axis, and nz be a refractive index along the z-axis, the refractive indices preferably satisfy $$0 < (ns-nz)/(ns-nf) \leq 1.$$

Preferably, a value of a product $\Delta nd$ of a birefringence index and liquid crystal layer thickness $\underline{d}$ of the liquid crystal cell falls within a range of 300 to 500 nm, and letting d' be a thickness of the third retardation film, the third retardation film has retardation with which a value (ns−nf)·d' falls within a range of 250 to 450 nm, and a value (ns−nz)·d' falls within a range of 70 to 450 nm.

The third retardation film may be laid out such that the direction in which the refractive index in the film plane is maximized is substantially perpendicular to the absorption axis of the adjacent polarizer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Figure 10:
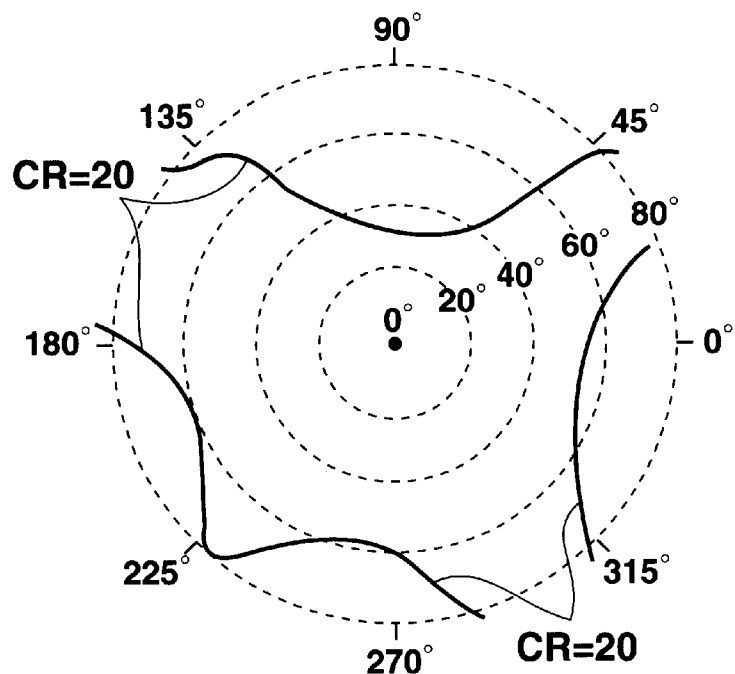
Figure 11:
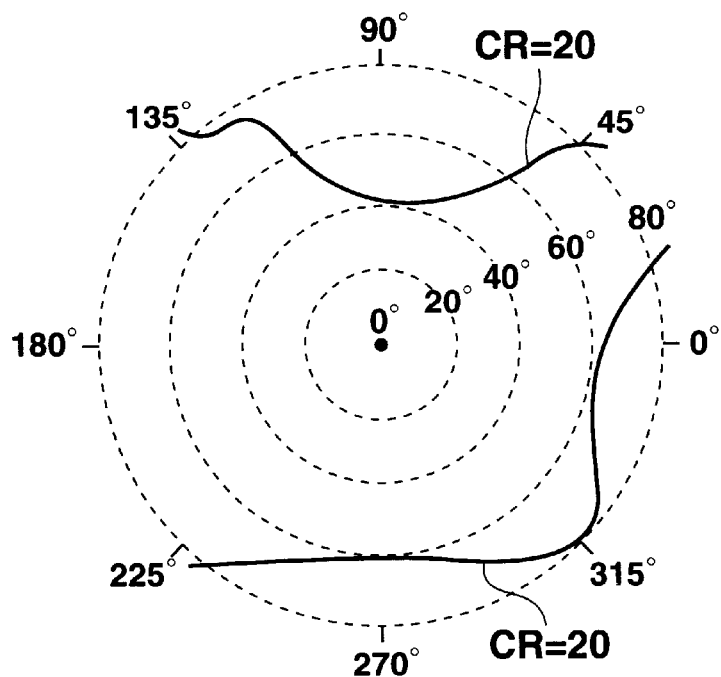
Figure 12:
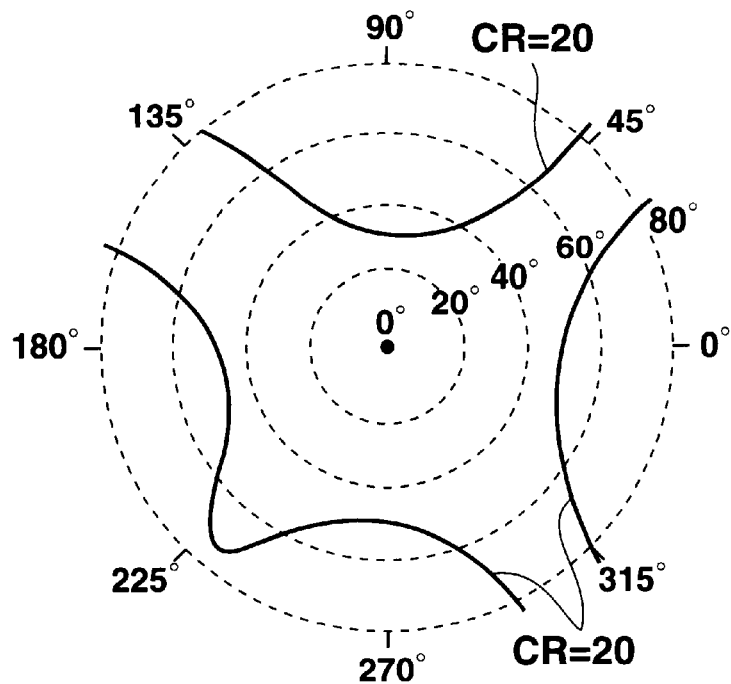
Figure 13:
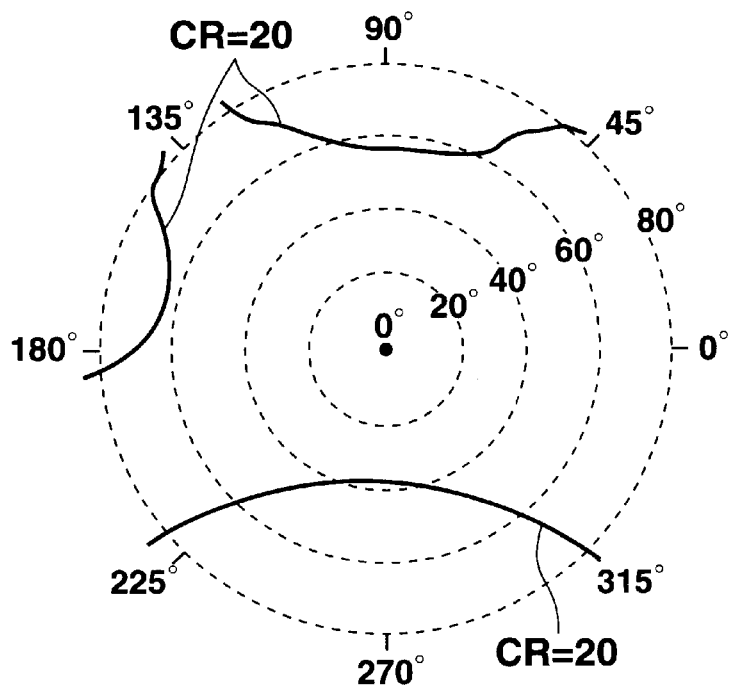
Figure 14:
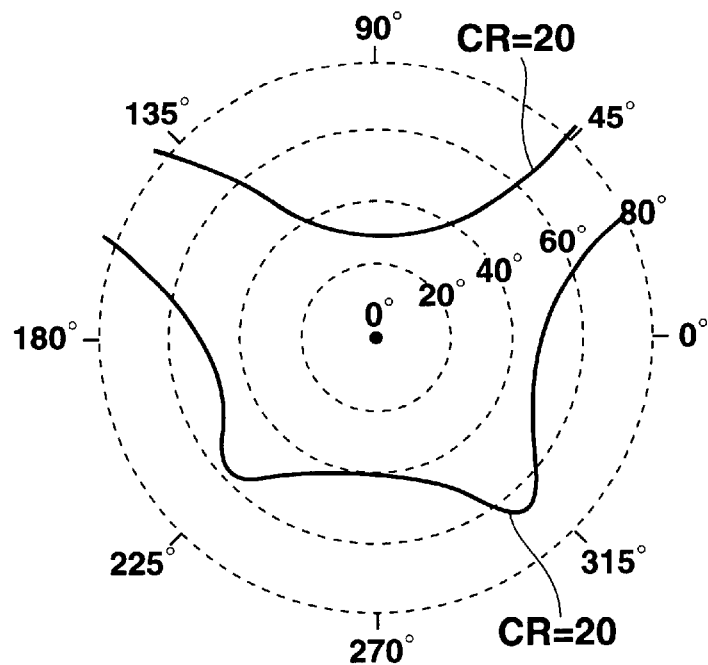
Figure 15:
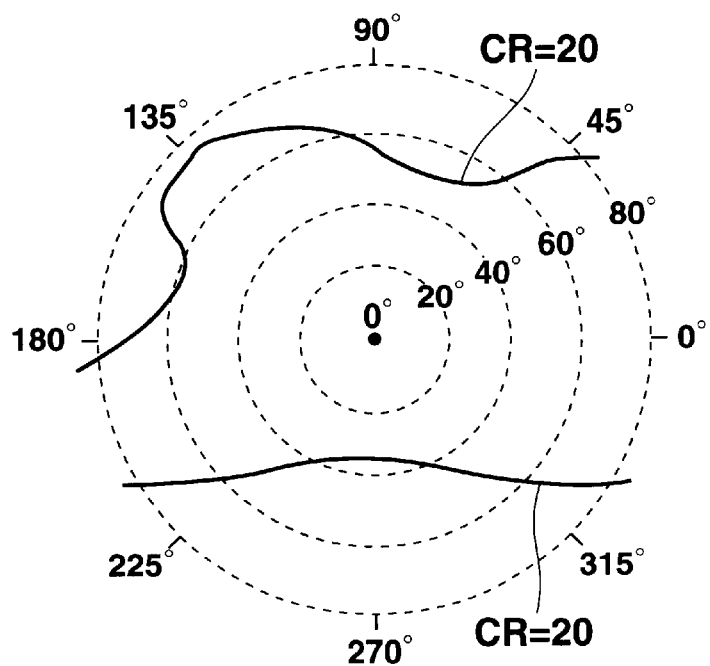
Figure 16:
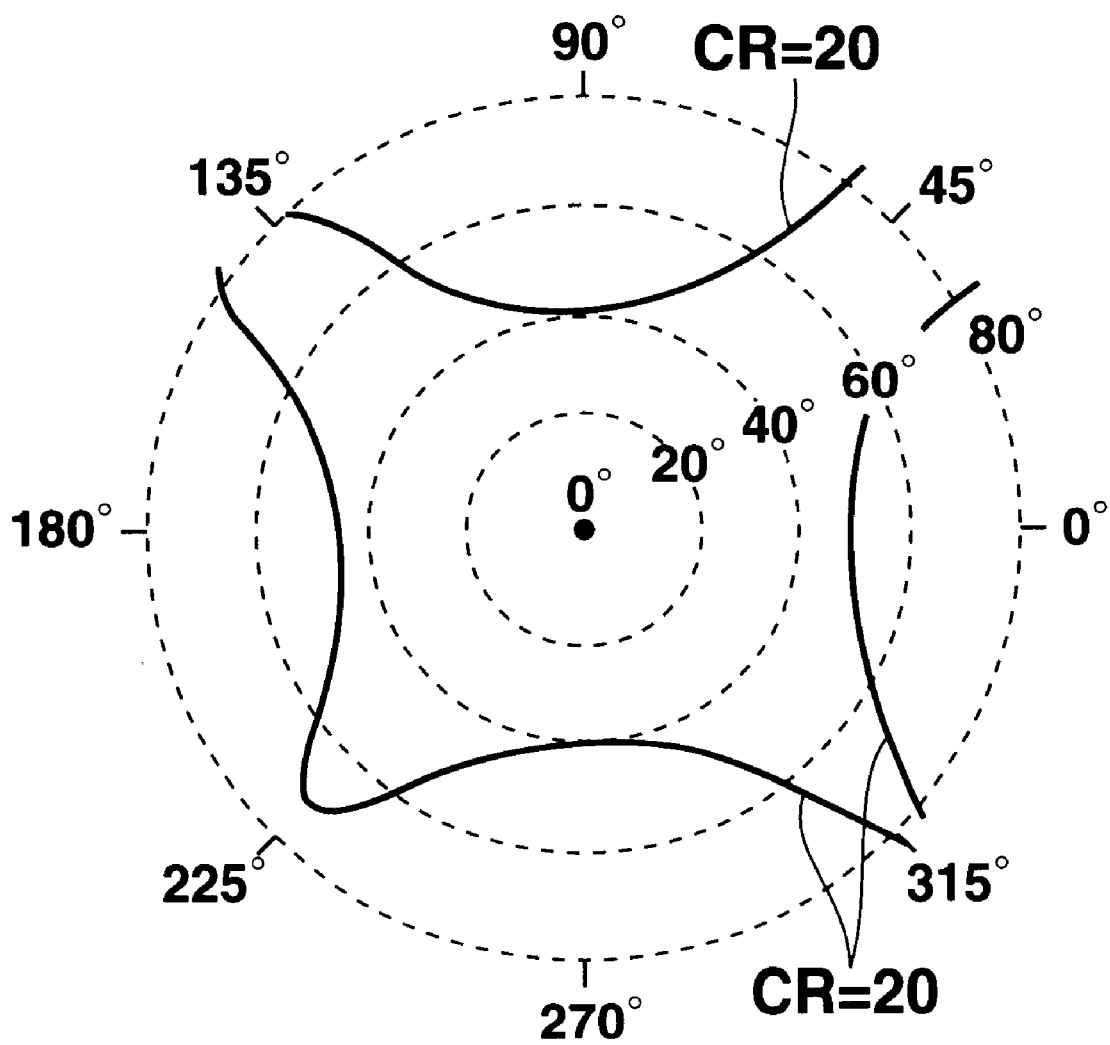
Figure 17:
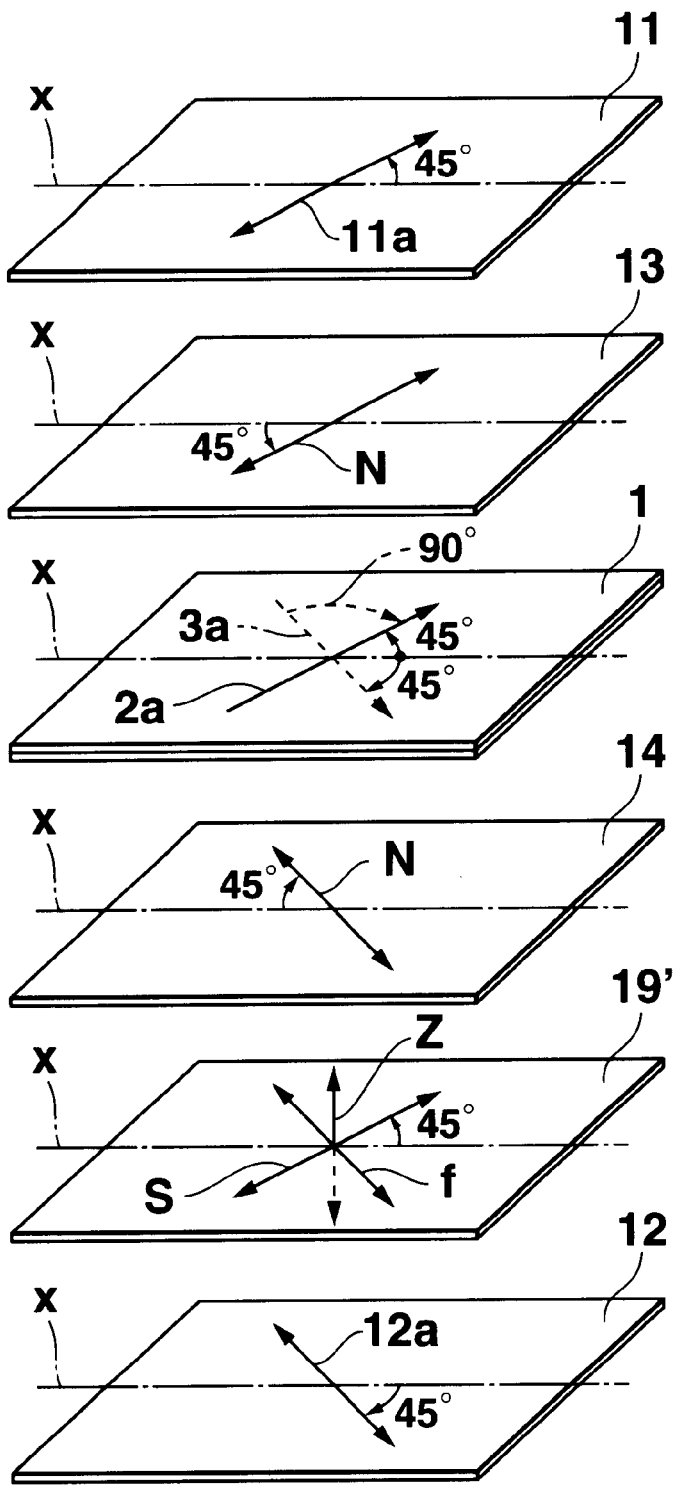
Figure 18:
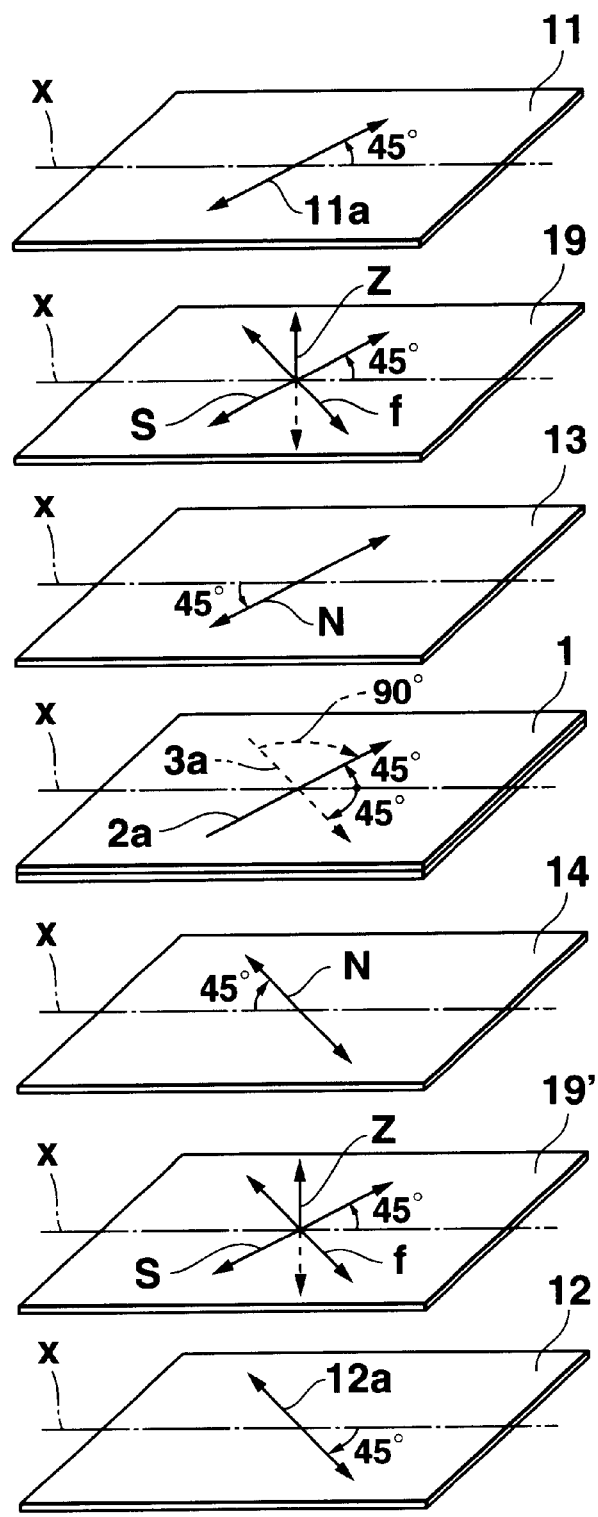

FIG. 10 is a view showing the viewing angle range of a liquid crystal display which uses a third retardation film having characteristics of (ns−nz)/(ns−nf)=0.3, (ns−nf)d'= 205 nm, and (ns−nz)d'=80 nm, and has an s-axis parallel to the absorption axis of the front polarizer;

FIG. 11 is a view showing the viewing angle range of a liquid crystal display which uses a third retardation film having characteristics of (ns−nz)/(ns−nf)=0.3, (ns−nf)d'= 205 nm, and (ns−nz)d'=80 nm, and has an s-axis perpendicular to the absorption axis of the front polarizer;

FIG. 12 is a view showing the viewing angle range of a liquid crystal display which uses a third retardation film having characteristics of (ns−nz)/(ns−nf)=0.3, (ns−nf)d'= 350 nm, and (ns−nz)d'=105 nm, and has an s-axis parallel to the absorption axis of the front polarizer;

FIG. 13 is a view showing the viewing angle range of a liquid crystal display which uses a third retardation film having characteristics of (ns−nz)/(ns−nf)=0.3, (ns−nf)d'= 350 nm, and (ns−nz)d'=105 nm, and has an s-axis perpendicular to the absorption axis of the front polarizer;

FIG. 14 is a view showing the viewing angle range of a liquid crystal display which uses a third retardation film having characteristics of (ns−nz)/(ns−nf)=0.3, (ns−nf)d'= 420 nm, and (ns−nz)d'=126 nm, and has an s-axis parallel to the absorption axis of the front polarizer;

FIG. 15 is a view showing the viewing angle range of a liquid crystal display which uses a third retardation film having characteristics of (ns−nz)/(ns−nf)=0.3, (ns−nf)d'= 420 nm, and (ns−nz)d'=126 nm, and has an s-axis perpendicular to the absorption axis of the front polarizer;

FIG. 16 is a view showing the viewing angle range of a comparative apparatus having no third retardation film;

FIG. 17 is an exploded perspective view showing a liquid crystal display according to the second embodiment of the present invention; and FIG. 18 is an exploded perspective view showing a liquid crystal display according to the third embodiment of the present invention.

DETAILED DESCRIPTION OF THE INVENTION

Liquid crystal display devices will be described below as embodiments of the present invention with reference to the accompanying drawing.

[First Embodiment]

Figure 1:
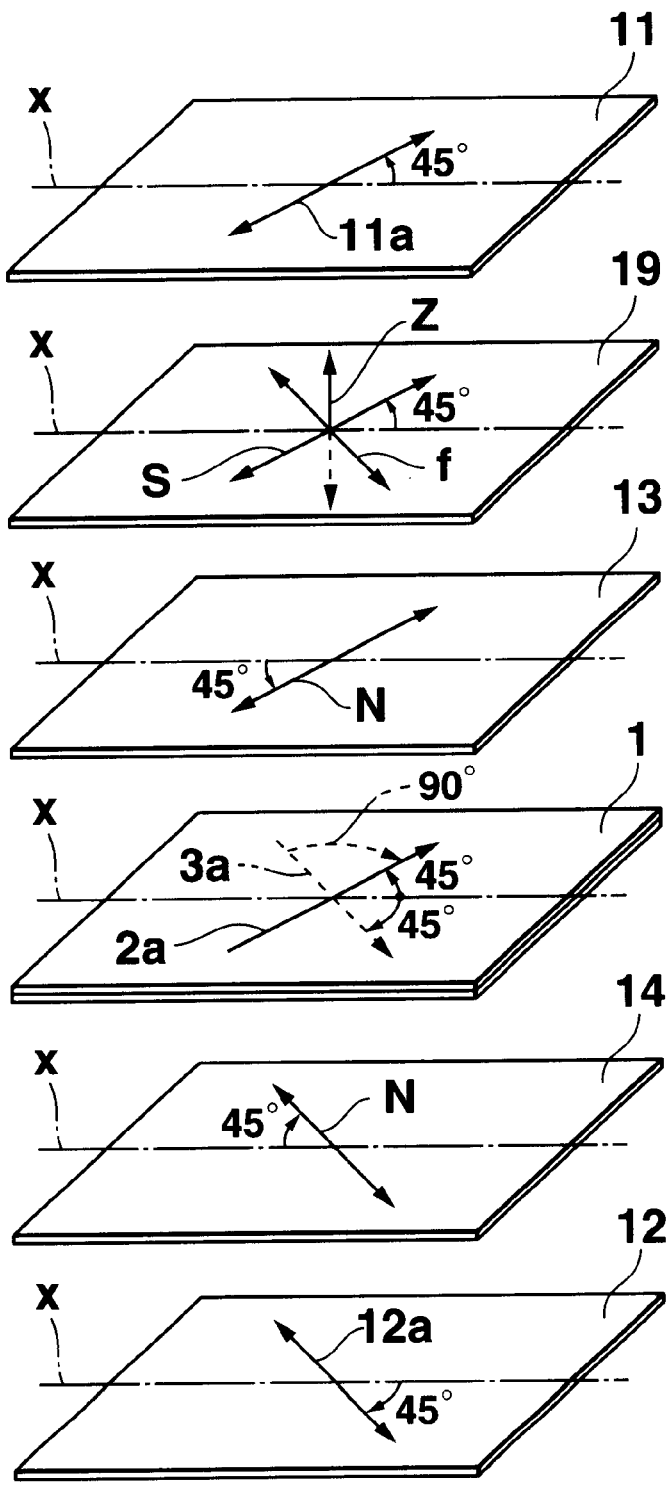
FIG. 1 is an exploded perspective view showing a liquid crystal display according to the first embodiment of the present invention.
Figure 2:
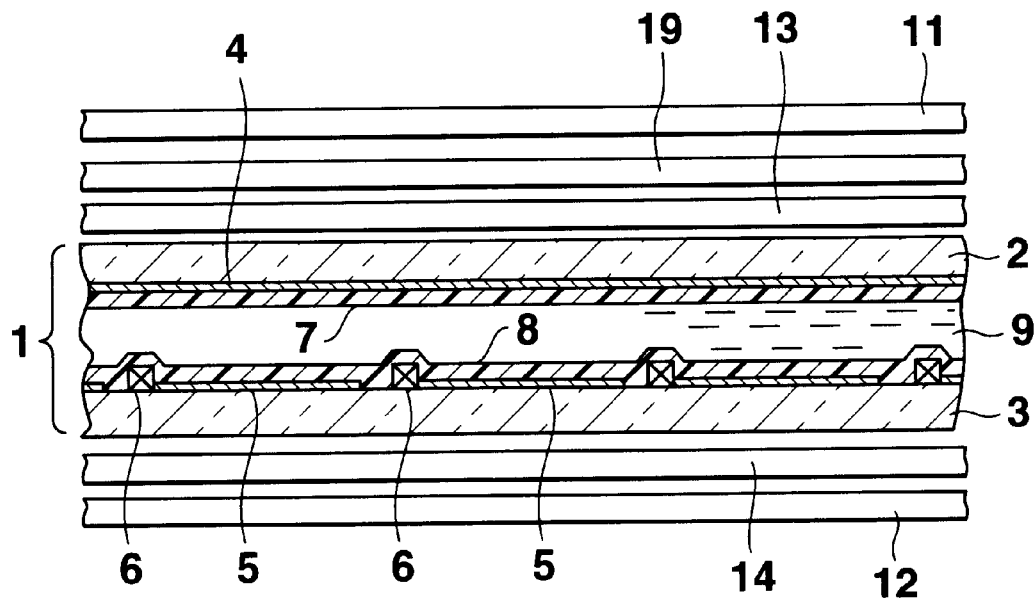
FIG. 2 is a sectional view showing part of the liquid crystal display.

FIGS. 1 to 15 show the first embodiment of the present invention. FIG. 1 is an exploded perspective view of a liquid crystal display. FIG. 2 is a sectional view showing part of the liquid crystal display.

As shown in FIGS. 1 and 2, the liquid crystal display of this embodiment has a liquid crystal cell 1, and front and rear polarizers 11 and 12 sandwiching the liquid crystal cell 1. A first retardation film 13 is inserted between the liquid crystal cell 1 and the front polarizer 11. A second retardation film 14 is inserted between the liquid crystal cell 1 and the rear polarizer 12. A third retardation film 19 is inserted between the first retardation film 13 and the adjacent front polarizer 11.

In the liquid crystal cell 1, a nematic liquid crystal layer 9 is formed between a pair of transparent substrates 2 and 3 on the front and rear sides, which are jointed via a frame-like sealing material (not shown), so as to be present in a region enclosed by the sealing material. The pair of substrates 2 and 3 have transparent electrodes 4 and 5 on their inner surfaces, respectively.

The liquid crystal cell 1 used in this embodiment employs the active matrix scheme. The electrode 5 formed on the inner surface of the rear substrate (lower substrate in FIG. 2) 3 comprises a plurality of pixel electrodes arrayed in the row and column directions to form a matrix. The electrode 4 formed on the inner surface of the front substrate 2 is a film-like counter electrode opposing the plurality of pixel electrodes 5. A plurality of TFTS (thin-film transistors) 6 are formed on the inner surface of the rear substrate 3 in correspondence with the plurality of pixel electrodes 5, respectively. A plurality of gate interconnections (not shown) for supplying gate signals to the TFTs 6 of rows and a plurality of data interconnections (not shown) for supplying data signals to the TFTs 6 of columns are also formed on the inner surface of the substrate 3. The plurality of pixel electrodes 5 are connected to the corresponding TFTs 6, respectively. Although FIG. 2 schematically illustrates each TFT 6, it comprises a gate electrode formed on the substrate 3, a transparent gate insulating film formed on almost the entire surface of the substrate 3 so as to cover the gate electrode, an i-type semiconductor film formed on the gate insulating film and opposing the gate electrode, and source and drain electrodes formed on both side portions of the I-type semiconductor film via an n-type semiconductor film. The pair of substrates 2 and 3 have, on their inner surfaces, alignment films 7 and 8 covering the electrodes 4 and 5, respectively. The alignment films 7 and 8 are aligned by rubbing their film planes in predetermined directions.

The liquid crystal display of this embodiment is a TN-type liquid crystal display. The alignment directions near the substrates 2 and 3 are regulated by aligning the alignment films 7 and 8 formed on the inner surfaces of the pair of substrates 2 and 3. The liquid crystal molecules are twisted at a twist angle of about 90° between the substrates 2 and 3. The front polarizer 11 and rear polarizer 12 are arranged having their absorption axes 11a and 12a (FIG. 1) almost perpendicular to each other.

The first and second retardation films 13 and 14 inserted between the liquid crystal cell 1 and the front polarizer 11 and between the liquid crystal cell 1 and the rear polarizer 12, respectively, have negative optical anisotropy with which the refractive index is minimized in a direction tilted in a predetermined direction with respect to the normal line to the film plane.

Figure 3:
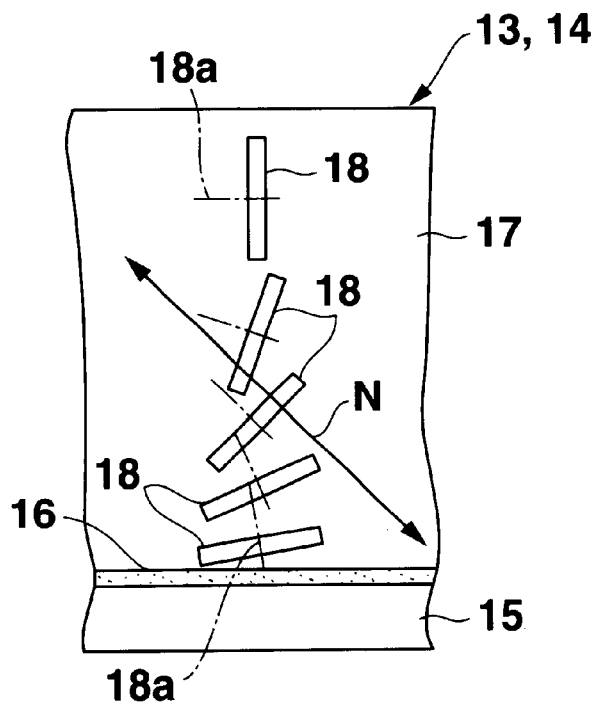
FIG. 3 is a schematic sectional view showing an optical anisotropic film used in the liquid crystal display.

FIG. 3 is a schematic sectional view of the first and second retardation films 13 and 14. Each of the first and second retardation films 13 and 14 used in this embodiment is formed from a discotic liquid crystal layer 17 in which discotic liquid crystal molecules 18 aligned along the film plane are hybrid-aligned to gradually rise from one surface toward the other surface.

Each of the first and second retardation films 13 and 14, each of which comprises the discotic liquid crystal layer 17, is manufactured by the following method: an aligning treatment film 16 for tilting the discotic liquid crystal molecules 18 in one direction at a uniform pretilt angle is formed on a transparent base film 15 by obliquely depositing SiO (silicon oxide), for example, a photo-setting discotic polymer liquid crystal is applied to the surface of the aligning treatment film 16 to a predetermined thickness, then, an electric or magnetic field is applied from the upper surface side to hybrid-align the tilted discotic liquid crystal molecules 18 to make them gradually rise from the upper surface toward the liquid crystal layer surface of the base film 15, and in this state, the discotic polymer liquid crystal is hardened by light irradiation.

The first and second retardation films 13 and 14 have negative optical anisotropy along the tilt direction of the hybrid-aligned discotic liquid crystal molecules 18. The refractive index is minimized in a direction along an average molecular axis 18a of the discotic liquid crystal molecules 18 in the intermediate layer of the discotic liquid crystal layer 17 and toward the surface (surface on the base film 15 side) on which the discotic liquid crystal molecules 18 are tilt-aligned, i.e., a direction N indicated by an arrow in FIG. 3. The direction N in which the refractive index is minimized will be referred to as the axial direction of the first or second retardation film.

The first and second retardation films 13 and 14 are inserted between the liquid crystal cell 1 and the front polarizer 11 and between the liquid crystal cell 1 and the rear polarizer 12, respectively, having, in predetermined directions, their axial directions N in which the refractive indices are minimized.

As shown in FIG. 1, the third retardation film 19 has an s-axis along which the refractive index is maximized in the film plane, an f-axis perpendicular to the s-axis in the film plane, and a z-axis along the normal line to the film plane. Let ns, nf, and nz be the refractive indices along the respective axes. The third retardation film 19 is a uniaxial (ns>nz=nf) or biaxial (ns>nz>nf) retardation film whose refractive indices have a relationship ns>nz≧nf. The third retardation film 19 is inserted between the first retardation film 13 and the adjacent front polarizer 11 having, in a predetermined direction, the s-axis direction in which the refractive index is maximized in the film plane.

FIG. 1 shows the layout of the elements of the liquid crystal display according to this embodiment, and the layout directions of the elements.

The liquid crystal cell 1 is laid out such that an aligning treatment direction 2a of the front substrate 2 is shifted by about 45° counterclockwise with respect to an abscissa x of the screen, which is indicated by an alternate long and short dashed line, when viewed from the front side, while an aligning treatment direction 3a of the rear substrate 3 is shifted by about 45° clockwise with respect to the abscissa x when viewed from the front side. Hence, the liquid crystal molecules in the liquid crystal layer 9 of the liquid crystal cell 1 are twisted counterclockwise at almost 90° from the rear substrate 3 toward the front substrate 2, when viewed from the front side, as indicated by a broken arrow in FIG. 1.

The first retardation film 13 is laid out such that the direction component along the film plane in the axial direction N, in which the refractive index is minimized, is shifted by about 45° counterclockwise with respect to the abscissa x when viewed from the front side. The second retardation film 14 is laid out such that the direction component along the film plane in the axial direction N, in which the refractive index is minimized, is shifted by about 45° clockwise with respect to the abscissa x when viewed from the front side.

Hence, the direction component of the first retardation film 13 along the film plane in the axial direction N, in which the refractive index is minimized, and the aligning treatment direction 2a of the front substrate 2 are almost parallel to each other in opposite directions. The direction component of the second retardation film 14 along the film plane in the axial direction N, in which the refractive index is minimized, and the aligning treatment direction 3a of the rear substrate 3 are almost parallel to each other in opposite directions.

The direction components of the first and second retardation films 13 and 14 along the film planes in the axial directions N, in which the refractive indices are minimized, only need be parallel to the aligning treatment directions 2a and 3a. The surface opposing the liquid crystal cell 1 may be either the surface on the base film 15 side, on which the discotic liquid crystal molecules 18 are aligned along the film plane, or the surface on which the discotic liquid crystal molecules 18 are raised with respect to the surface of the base film 15.

The front polarizer 11 is laid out such that the absorption axis 11a is shifted by about 45° counterclockwise with respect to the abscissa x when viewed from the front side so as to be almost parallel to the aligning treatment direction 2a of the front substrate 2. The rear polarizer 12 is laid out such that the absorption axis 12a is shifted by about 45° clockwise with respect to the abscissa x when viewed from the front side so as to be almost parallel to the aligning treatment direction 3a of the rear substrate 3. Hence, the absorption axes 11a and 12a of the front and rear polarizers 11 and 12 are perpendicular to each other.

The third retardation film 19 is laid out such that the direction (s-axis) in which the refractive index is maximized in the film plane is shifted by about 45° counterclockwise or clockwise (counterclockwise in FIG. 1) with respect to the abscissa x when viewed from the front side.

Hence, the s-axis of the third retardation film 19 is almost parallel to the absorption axis 11a of the front polarizer 11 adjacent to the third retardation film 19 and also parallel or perpendicular to the aligning treatment direction 2a of the front substrate 2. The refractive indices ns, nf, and nz in the directions of s-, f-, and z-axes of the third retardation film 19 have a following relationship.

$$0 < (ns-nz)/(ns-nf) \leq 1$$

The refractive index anisotropy (ns−nf) in the film plane is equal to or larger than the refractive index anisotropy (ns−nz) in the direction of film thickness.

The third retardation film 19 has retardation corresponding to a product Δnd of a birefringence index Δn and thickness d of the liquid crystal layer 9 of the liquid crystal cell 1. In this embodiment, when the value Δnd of the liquid crystal cell 1 falls within the range of 300 to 500 nm, and the thickness of the third retardation film 19 is represented by d', it has retardation with which a value (ns−nf)d' falls within the range of 250 to 450 nm, and a value (ns−nz)d' falls within the range of 70 to 450 nm.

The liquid crystal display having the above arrangement can obtain high-contrast display at a wide viewing angle because the first and second retardation films 13 and 14 having negative optical anisotropy with which the refractive index is minimized in the axial direction N tilted in a predetermined direction with respect to the normal line to the film plane are inserted between the liquid crystal cell 1 and the front polarizer 11 and between the liquid crystal cell 1 and the rear polarizer 12, respectively, such that the axial direction N in which the refractive index is minimized is directed in a predetermined direction, and the third retardation film 19 is inserted between the first retardation film 13 and the adjacent front polarizer 11.

More specifically, in the conventional TN-type liquid crystal display, when no voltage is applied to two electrodes sandwiching the liquid crystal layer, light incident on the liquid crystal layer of the liquid crystal cell through the incident-side polarizer changes its retardation in the liquid crystal layer depending on the incident angle, so the transmittance changes depending on the direction of light incidence.

When a voltage is applied to two electrodes sandwiching the liquid crystal layer, the liquid crystal molecules in the intermediate portion of the liquid crystal layer align themselves in the direction of voltage application though the liquid crystal molecules near a substrate do not completely align themselves in the direction of voltage application. For this reason, retardation remains due to the influence of the liquid crystal molecules near the substrate, which are aligned parallel or oblique to the substrate. Due to this residual retardation, the transmittance cannot be made sufficiently low, and the contrast becomes low even when the voltage is applied.

To the contrary, in the liquid crystal display of this embodiment, the first and second retardation films 13 and 14 are inserted between the liquid crystal cell 1 and the front and rear polarizers 11 and 12, respectively, such that the direction components along the film planes in the axial directions N, in which the refractive indices are minimized, are set along the aligning treatment directions 2a and 3a of the substrates 2 and 3, respectively. In addition, the third retardation film 19 is inserted between the front polarizer 11 and the first retardation film 13 such that the direction (s-axis) which has refractive index anisotropy in the film plane and in which the refractive index in the film plane is maximized becomes parallel to the absorption axis 11a of the front polarizer 11. For this reason, the retardation difference generated by the difference in incident angle of light that becomes incident obliquely with respect to the normal direction to the liquid crystal display and passes through the liquid crystal layer 9, and residual retardation generated in the liquid crystal molecules near the substrates 2 and 3 of the liquid crystal layer 9 when a voltage is applied to the electrodes 5 and 6 sandwiching the liquid crystal layer 9 can be compensated.

Light passing through the liquid crystal display when no voltage is applied to the electrodes 5 and 6 sandwiching the liquid crystal layer 9 will be described.

Light incident from the normal direction to the liquid crystal display passes through the rear polarizer 12. The light passes through the second retardation film 14 while oscillating in a direction perpendicular to the direction component along the film plane in the axial direction N in which the refractive index is minimized. The light also passes through the liquid crystal layer 9 with twist alignment while changing the oscillation direction by almost 90°. The oscillation direction is perpendicular to the aligning treatment direction 2a of the front substrate 2. Then, the light passes through the first retardation film 13 while oscillating in a direction perpendicular to the direction component along the film plane in the axial direction N in which the refractive index is minimized, and emerges from the first retardation film 13. The polarized light becomes incident on the third retardation film 19 almost perpendicularly to the s-axis parallel to the aligning treatment direction 2a. The light in the linearly polarized state passes through the third retardation film 19 without changing the oscillation direction. The light finally passes through the front polarizer 11 having the absorption axis 11a parallel to the s-axis and emerges from the liquid crystal display.

Light incident obliquely with respect to the normal direction of the liquid crystal display emerges from the liquid crystal layer 9 while obtaining retardation different from that of light incident from the normal direction because the apparent thickness of the liquid crystal layer 9 changes during passage through the layer. Then, the light passes through the first retardation film 13 and becomes incident on the third retardation film along the s-axis.

Light incident on the third retardation film while oscillating in a direction neither parallel nor perpendicular to the s-axis is affected by refractive index anisotropy (ns−nf) of the film plane of the third retardation film. For this reason, the retardation difference between the incident light and light incident from the normal direction is canceled by the refractive index anisotropy, so the light passes through the front polarizer 11.

Light passing through the liquid crystal display when a voltage is applied to the electrodes 5 and 6 sandwiching the liquid crystal layer 9 will be described. Light incident on the liquid crystal display from the normal direction passes through the rear polarizer 12. The light passes through the second retardation film 14 while oscillating in a direction perpendicular to the direction component along the film plane in the axial direction N in which the refractive index is minimized.

For the light incident on the liquid crystal cell 1, residual retardation generated by liquid crystal molecules aligned along the inner surface of the substrate 3 in the liquid crystal layer 9 near the substrate 3 is compensated by the second retardation film whose direction component along the film plane in the axial direction N is parallel to the aligning treatment direction 3a. The light passes through liquid crystal molecules at the intermediate portion of the liquid crystal layer 9, which are aligned in the direction of voltage application, without changing the oscillation direction. Residual retardation generated by liquid crystal molecules aligned along the inner surface of the substrate 2 in the liquid crystal layer 9 near the substrate 2 is compensated by the first retardation film 13 arranged in front of the liquid crystal cell 1, whose direction component along the film plane in the axial direction N is parallel to the aligning treatment direction 2a.

Hence, the light incident on the liquid crystal display from the normal direction becomes polarized light that propagates through the portion between the second retardation film 14 and the first retardation film 13 without changing its oscillation direction perpendicular to the absorption axis 12a of the rear polarizer 12. The polarized light becomes incident on the third retardation film, whose s-axis is arranged parallel to the aligning treatment direction 2a, almost perpendicularly to the s-axis. The polarized light in the linear polarized state passes through the third retardation film without changing the oscillation direction, i.e., with an oscillation component perpendicular to the absorption axis 12a of the rear polarizer 12. The polarized light is absorbed by the absorption axis 11a of the front polarizer 11, which is perpendicular to the absorption axis 12a of the rear polarizer 12.

As in the above-described case wherein no voltage is applied to the electrodes sandwiching the liquid crystal layer 9, for light incident obliquely with respect to the normal direction to the liquid crystal display, the difference between retardation generated in obliquely passing through the liquid crystal layer 9 and that in passing in the normal direction is compensated by the third retardation film 19. For this reason, the light incident on the second retardation film 14 can emerge from the third retardation film 19 with almost no change in oscillation direction and is absorbed by the absorption axis 11a of the front polarizer 11, which is perpendicular to the absorption axis 12a of the rear polarizer 12.

Hence, when a voltage is applied to the electrodes 5 and 6 sandwiching the liquid crystal layer 9, for light incident on the liquid crystal display, residual retardation generated in the liquid crystal molecules in the liquid crystal layer 9 near the substrates 2 and 3 is compensated by the first and second retardation films 13 and 14, i.e., the internal discotic liquid crystal layers 18. In addition, the retardation difference caused by the difference in incident angle is compensated by the third retardation film. For this reason, sufficiently black display with low transmittance can be obtained independently of the incident angle of light.

Since the first and second retardation films 13 and 14 are formed by aligning the discotic liquid crystal molecules 18, the refractive index anisotropy of the component perpendicular to the film plane direction is small. For this reason, the first and second retardation films 13 and 14 can compensate only residual retardation generated near the substrates 2 and 3 of the liquid crystal layer 9 without generating any retardation to compensate the retardation generated in accordance with the incident angle when the light obliquely passes through the liquid crystal layer 9.

The retardation difference due to the difference in incident angle can be compensated independently of whether the s-axis of the third retardation film 19 is set parallel or perpendicular to the absorption axis 11a of the front polarizer 11 and the aligning treatment direction 2a. In any case, the retardation difference due to the difference in incident angle of light is compensated by the refractive index anisotropy (ns−nf) of the film plane.

In the third retardation film 19 used in this embodiment, the refractive indices ns, nf, and nz in the directions of s-, f-, and z-axes have the following relationship.

$$0<(ns-nz)/(ns-nf)\leq 1$$

Since the refractive index anisotropy (ns−nf) in the film plane is equal to or larger than the refractive index anisotropy (ns−nz) of the section in the direction of film thickness, light incident in a direction neither parallel nor perpendicular to the s-axis can be elliptically polarized. For this reason, the retardation difference can be compensated by the third retardation film 19, and the viewing angle range can be made sufficiently wide.

As described above, when the value Δnd of the liquid crystal cell 1 falls within, e.g., the range of 300 to 500 nm, a third retardation film 19 having retardation with which the value (ns−nf)d' falls within the range of 250 to 450 nm, and the value (ns−nz)d' falls within the range of 70 to 450 nm is preferably used. When a third retardation film 19 with such characteristics is used, the viewing angle range can be made sufficiently wide, and high-contrast display with satisfactory color appearance and almost no stripe colors can be obtained.

FIGS. 4 to 15 are views showing measurement data of the viewing angle range of the liquid crystal display of this embodiment. FIG. 16 is a view showing the measurement data of the viewing angle range of a liquid crystal display as a comparative example having no third retardation film. These figures show the viewing angle ranges in which display with contrast CR of 20 or more can be observed.

Referring to FIGS. 4 to 15 and 16, a plurality of concentric circles indicated by broken lines represent observation angles of 20°, 40°, 60°, and 80° with respect to the normal line (0°) to the screen of the liquid crystal display. Angles at the outer periphery represent the display observation directions, in which 0° indicates the right of the screen in the horizontal direction, 90° indicates the upper side of the screen in the vertical direction, 180° indicates the left of the screen in the horizontal direction, and 270° indicates the lower side of the screen in the vertical direction.

In these measurement data, the characteristics of the third retardation film 19, the layout directions of the third retardation film 19 with respect to the absorption axis 11a of the front polarizer 11, and the viewing angle ranges (vertical and horizontal angle ranges of the screen in which the contrast CR of 20 or more can be obtained) are as follows.

Mode 1

In Mode 1, the third retardation film 19 has following characteristics.

$(ns-nz)/(ns-nf)=1,$ $(ns-nf)d'=260$ nm, $(ns-nz)d'=260$ nm,

The s-axis was arranged to be parallel to the absorption axis 11a of the front polarizer 11.

Figure 4:
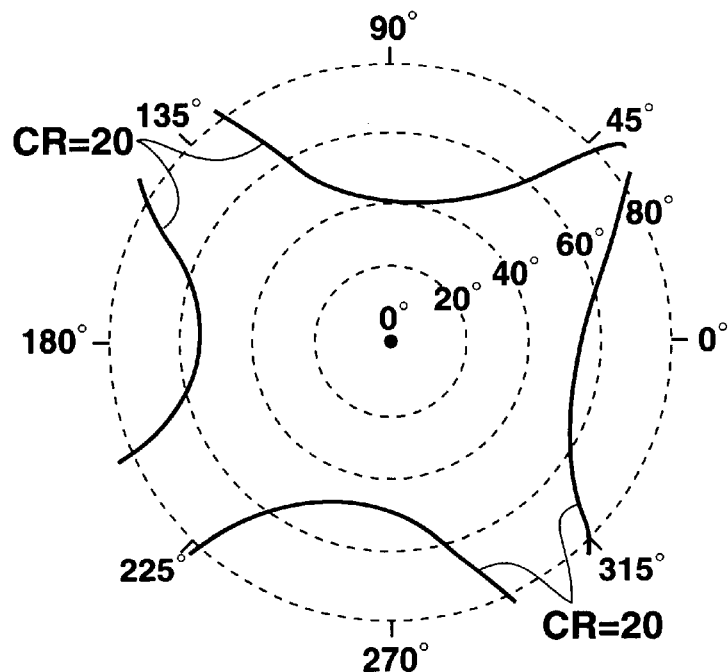
FIG. 4 is a view showing the viewing angle range of a liquid crystal display which uses a third retardation film having characteristics of (ns−nz)/(ns−nf)=1, (ns−nf)d'=260 nm, and (ns−nz)d'=260 nm, and has an s-axis parallel to the absorption axis of the front polarizer.

As shown in FIG. 4, the viewing angle ranges in Mode 1 are 40° (upper) to 50° (lower), and 46° (left) to 50° (right).

Mode 2

In Mode 2, the third retardation film 19 has following characteristics.

$(ns-nz)/(ns-nf)=1,$ $(ns-nf)d'=260$ nm, $(ns-nz)d'=260$ nm,

The s-axis was arranged to be perpendicular to the absorption axis 11a of the front polarizer 11.

Figure 5:
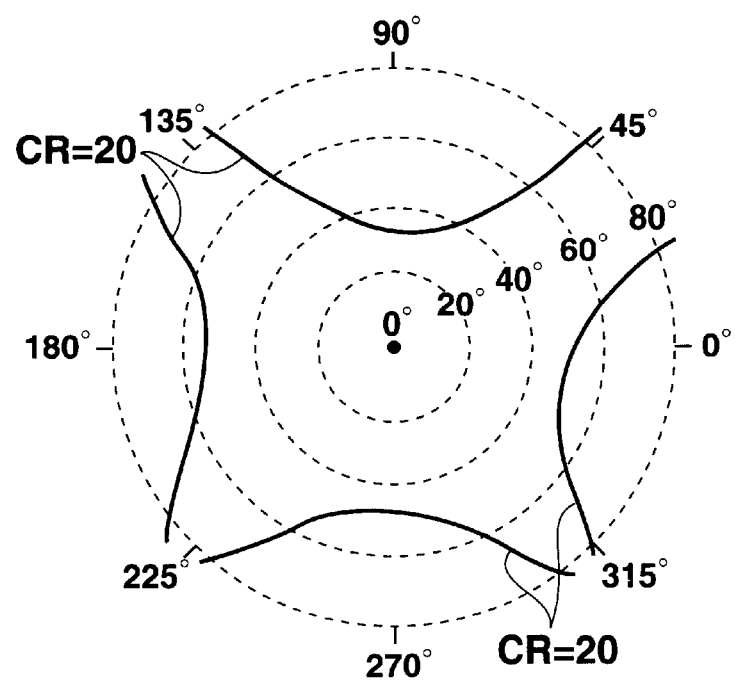
FIG. 5 is a view showing the viewing angle range of a liquid crystal display which uses a third retardation film having characteristics of (ns−nz)/(ns−nf)=1, (ns−nf)d'=260 nm, and (ns−nz)d'=260 nm, and has an s-axis perpendicular to the absorption axis of the front polarizer.

As shown in FIG. 5, the viewing angle ranges in Mode 2 are 30° (upper) to 50° (lower), and 50° (left) to 50° (right).

Mode 3

In Mode 3, the third retardation film 19 has following characteristics.

$(ns-nz)/(ns-nf)=1,$ $(ns-nf)d'=350$ nm, $(ns-nz)d'=350$ nm,

The s-axis was arranged to be parallel to the absorption axis 11a of the front polarizer 11.

Figure 6:
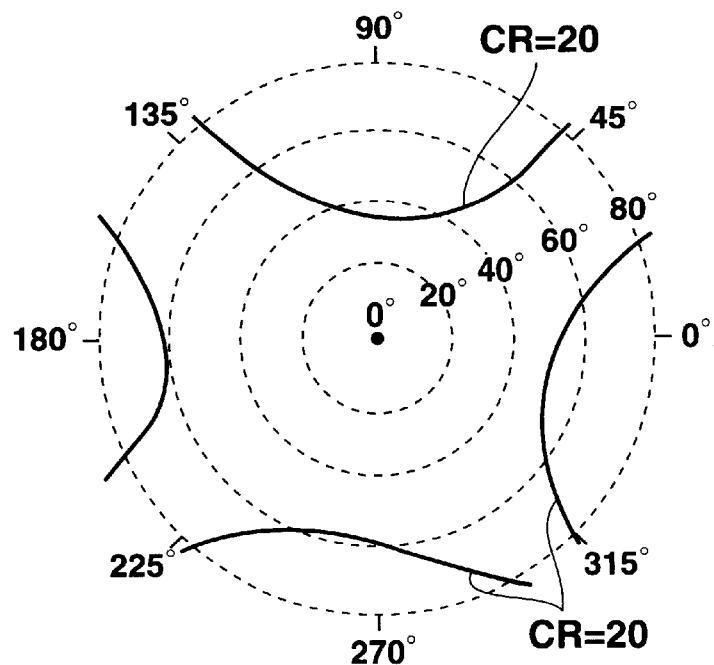
FIG. 6 is a view showing the viewing angle range of a liquid crystal display which uses a third retardation film having characteristics of (ns−nz)/(ns−nf)=1, (ns−nf)d'=350 nm, and (ns−nz)d'=350 nm, and has an s-axis parallel to the absorption axis of the front polarizer.

As shown in FIG. 6, the viewing angle ranges in Mode 3 are 36° (upper) to 58° (lower), and 60° (left) to 50° (right).

Mode 4

In Mode 4, the third retardation film 19 has following characteristics.

$(ns-nz)/(ns-nf)=1,$ $(ns-nf)d'=350$ nm, $(ns-nz)d'=350$ nm,

The s-axis was arranged to be perpendicular to the absorption axis 11a of the front polarizer 11.

Figure 7:
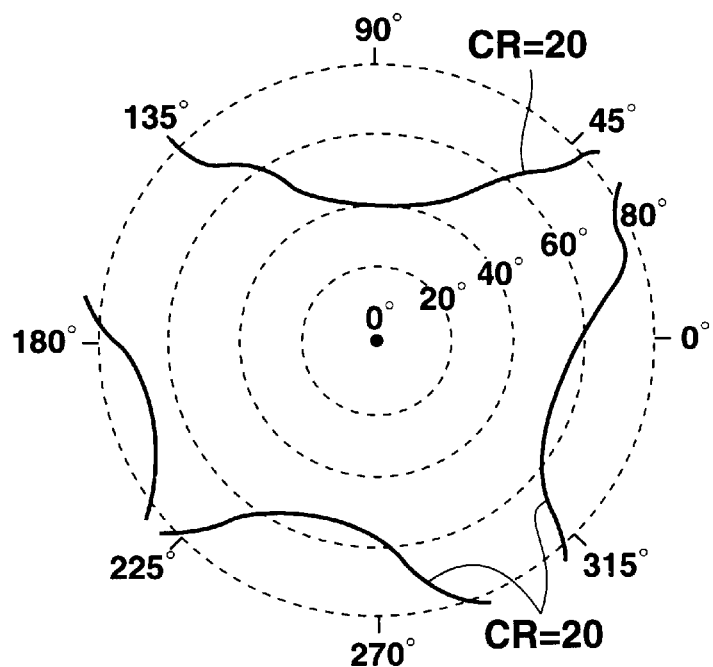
FIG. 7 is a view showing the viewing angle range of a liquid crystal display which uses a third retardation film having characteristics of (ns−nz)/(ns−nf)=1, (ns−nf)d'=350 nm, and (ns−nz)d'=350 nm, and has an s-axis perpendicular to the absorption axis of the front polarizer.

As shown in FIG. 7, the viewing angle ranges in Mode 4 are 40° (upper) to 50° (lower), and 80° (left) to 50° (right).

Mode 5

In Mode 5, the third retardation film 19 has following characteristics.

$(ns-nz)/(ns-nf)=1,$ $(ns-nf)d'=440$ nm, $(ns-nz)d'=440$ nm,

The s-axis was arranged to be parallel to the absorption axis 11a of the front polarizer 11.

Figure 8:
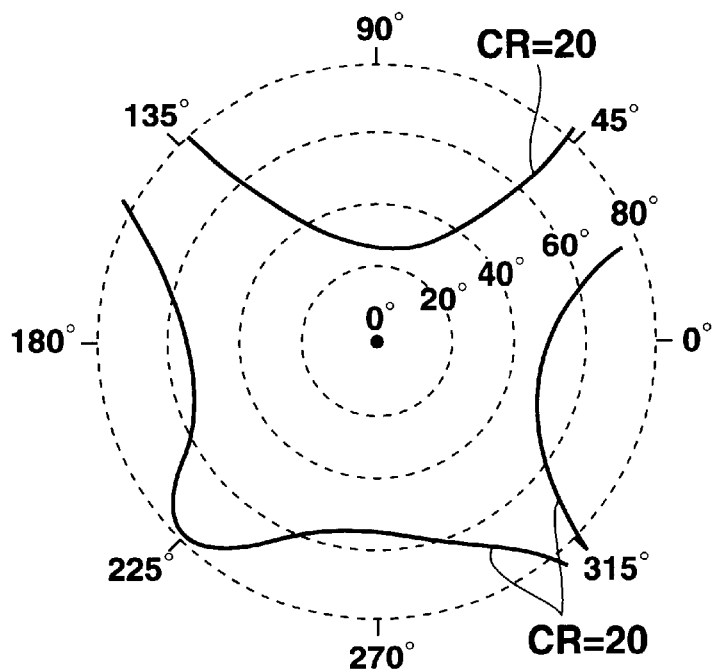
FIG. 8 is a view showing the viewing angle range of a liquid crystal display which uses a third retardation film having characteristics of (ns−nz)/(ns−nf)=1, (ns−nf)d'=440 nm, and (ns−nz)d'=440 nm, and has an s-axis parallel to the absorption axis of the front polarizer.

As shown in FIG. 8, the viewing angle ranges in Mode 5 are 30° (upper) to 54° (lower), and 52° (left) to 46° (right).

Mode 6

In Mode 6, the third retardation film 19 has following characteristics.

$(ns-nz)/(ns-nf)=1$, $(ns-nf)d'=440$ nm, $(ns-nz)d'=440$ nm,

The s-axis was arranged to be perpendicular to the absorption axis 11a of the front polarizer 11.

Figure 9:
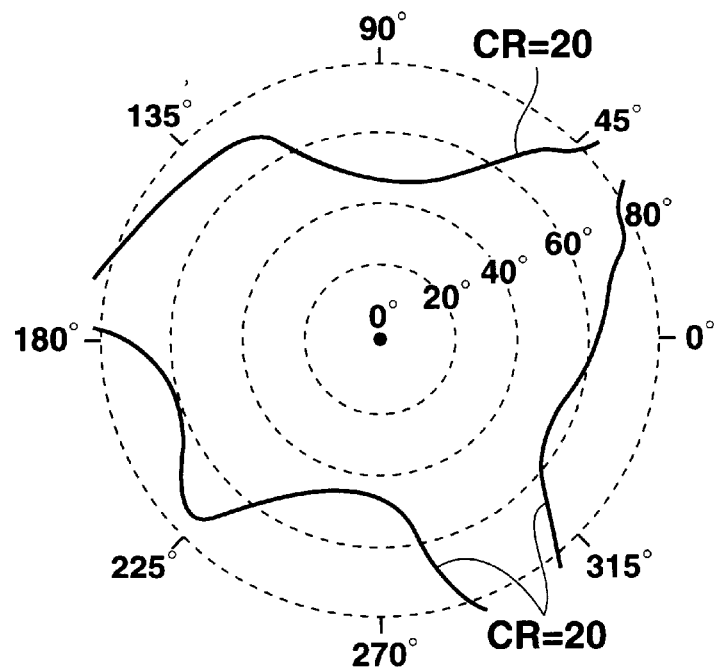
FIG. 9 is a view showing the viewing angle range of a liquid crystal display which uses a third retardation film having characteristics of (ns−nz)/(ns−nf)=1, (ns−nf)d'=440 nm, and (ns−nz)d'=440 nm, and has an s-axis perpendicular to the absorption axis of the front polarizer.

As shown in FIG. 9, the viewing angle ranges in Mode 6 are 45° (upper) to 45° (lower), and 80° (left) to 60° (right).

Mode 7

In Mode 7, the third retardation film 19 has following characteristics.

$(ns-nz)/(ns-nf)=0.3$, $(ns-nf)d'=205$ nm, $(ns-nz)d'=80$ nm,

The s-axis was arranged to be parallel to the absorption axis 11a of the front polarizer 11.

As shown in FIG. 10, the viewing angle ranges in Mode 7 are 38° (upper) to 60° (lower), and 80° (left) to 54° (right).

Mode 8

In Mode 8, the third retardation film 19 has following characteristics.

$(ns-nz)/(ns-nf)=0.3$, $(ns-nf)d'=205$ nm, $(ns-nz)d'=80$ nm,

The s-axis was arranged to be perpendicular to the absorption axis 11a of the front polarizer 11.

As shown in FIG. 11, the viewing angle ranges in Mode 8 are 38° (upper) to 60° (lower), and 80° (left) to 58° (right).

Mode 9

In Mode 9, the third retardation film 19 has following characteristics.

$(ns-nz)/(ns-nf)=0.3$, $(ns-nf)d'=350$ nm, $(ns-nz)d'=105$ nm,

The s-axis was arranged to be parallel to the absorption axis 11a of the front polarizer 11.

As shown in FIG. 12, the viewing angle ranges in Mode 9 are 30° (upper) to 50° (lower), and 50° (left) to 50° (right).

Mode 10

In Mode 10, the third retardation film 19 has following characteristics.

$(ns-nz)/(ns-nf)=0.3$, $(ns-nf)d'=350$ nm, $(ns-nz)d'=105$ nm,

The s-axis was arranged to be perpendicular to the absorption axis 11a of the front polarizer 11.

As shown in FIG. 13, the viewing angle ranges in Mode 10 are 58° (upper) to 36° (lower), and 65° (left) to 80° (right).

Mode 11

In Mode 11, the third retardation film 19 has following characteristics.

$(ns-nz)/(ns-nf)=0.3$, $(ns-nf)d'=420$ nm, $(ns-nz)d'=126$ nm,

The s-axis was arranged to be parallel to the absorption axis 11a of the front polarizer 11.

As shown in FIG. 14, the viewing angle ranges in Mode 11 are 28° (upper) to 38° (lower), and 48° (left) to 44° (right).

Mode 12

In Mode 12, the third retardation film 19 has following characteristics $(ns-nz)/(ns-nf)=0.3$, $(ns-nf)d'=420$ nm, $(ns-nz)d'=126$ nm, The s-axis was arranged to be perpendicular to the absorption axis 11a of the front polarizer 11.

As shown in FIG. 15, the viewing angle ranges in Mode 12 are 56° (upper) to 34° (lower), and 70° (left) to 80° (right).

In the comparative apparatus shown in FIG. 16, the vertical and horizontal viewing angle ranges of the screen in which the contrast CR of 20 or more can be obtained are 40° (upper) to 40° (lower), and 44° (left) to 46° (right), as shown in FIG. 16. However, in each of the liquid crystal displays in the above modes, which has the third retardation film 19 of the first embodiment, for the vertical and horizontal viewing angle ranges of the screen in which the contrast CR of 20 or more can be obtained, the horizontal viewing angles of the screens are wider as compared to the comparative apparatus.

Generally, a liquid crystal display is mainly required to have a wide horizontal viewing angle. Each of the liquid crystal displays in Modes 1 to 12 of the first embodiment, which has the third retardation film 19 in addition to the first and second retardation films 13 and 14, has a sufficiently wide horizontal viewing angle.

In each of the liquid crystal displays in Modes 1 to 12, the color appearance of display has a very small chromaticity shift from the achromatic color point on the CIE chromaticity diagram. Hence, high-contrast display with satisfactory tincture and almost no color tinge can be obtained.

That is, as in the liquid crystal display of this embodiment, a liquid crystal display in which the aligning treatment directions 2a and 3a of the front and rear substrates 2 and 3 of the liquid crystal cell 1 are shifted by about 45° with respect to the abscissa x of the screen, and the liquid crystal molecules in the liquid crystal cell 1 are twisted at a twist angle of about 90° between the substrates 2 and 3.

Where the direction components of the first and second retardation films 13 and 14 along the film planes in the axial directions N are almost parallel to the aligning treatment directions 2a and 3a, the absorption axis 11a of the front polarizer 11 is almost parallel to the aligning treatment direction 2a, the absorption axis 12a of the rear polarizer 12 is almost parallel to the aligning treatment direction 3a, the third retardation film 19 is laid out such that the direction (s-axis) which has refractive index anisotropy in the film plane and in which the refractive index in the film plane is maximized becomes almost parallel or perpendicular to the absorption axis 11a of the adjacent front polarizer 11, the refractive indices ns, nf, and nz in the directions of s-, f-, and z-axes of the third retardation film 19 have the relationship $0<(ns-nz)/(ns-nf) \leq 1$, the value $\Delta nd$ of the liquid crystal cell 1 falls within, e.g., 300 to 500 nm, and the third retardation film 19 has retardation with which the value (ns−nf)d' falls within the range of 250 to 450 nm, and the value (ns−nz)d' falls within the range of 70 to 450 nm, at least the horizontal viewing angle of the screen can be made sufficiently wide, and high-contrast;

display with satisfactory tincture and almost no color tinge can be obtained.

The cases (Modes 1, 3, 5, 7, 9, and 11) wherein the s-axis is set parallel to the absorption axis 11a of the front polarizer 11 using the third retardation films 19 having the same characteristics and the cases (Modes 2, 4, 6, 8, 10, and 12) wherein the s-axis is set perpendicular to the absorption axis 11a of the front polarizer 11 will be compared. As is apparent from comparison between FIGS. 4 and 5, FIGS. 6 and 7, FIGS. 8 and 9, FIGS. 10 and 11, FIGS. 12 and 13, and FIGS. 14 and 15 in association with the viewing angle ranges of the liquid crystal displays, if the retardation characteristic is the same, the viewing angle range tends to be wide when the s-axis is set perpendicular to the absorption axis 11a of the front polarizer 11.

The viewing angle characteristics in Modes 1 to 12 will be compared. Especially, in Mode 3 shown in FIG. 6, Mode 4 shown in FIG. 7, Mode 6 shown in FIG. 9, Mode 7 shown in FIG. 10, Mode 8 shown in FIG. 11, Mode 10 shown in FIG. 13, and Mode 12 shown in FIG. 15, the horizontal viewing angle is wider than that of the comparative apparatus having no third retardation film 19, and the vertical viewing angle is also sufficiently wide. For the horizontal viewing angle, the characteristics shown in FIG. 11 (Mode 8), FIG. 13 (Mode 10), and FIG. 15 (Mode 12) are excellent. Especially, the characteristic shown in FIG. 13 (Mode 10) is most satisfactory.

That is, preferable modes are Modes 3, 4, 6, 7, 8, 10, and 12. More preferable modes are Modes 8, 10, and 12. A much more preferable mode is Mode 10.

Preferable Modes 3, 4, 6, 7, 8, 10, and 12 will be applied to the characteristics of the third retardation film 19. When the s-axis in which the refractive index in the film plane is maximized is set almost parallel to the absorption axis 11a of the adjacent front polarizer 11, a uniaxial retardation film that satisfies (ns−nz)/(ns−nf)=1 and has values (nd−nf)d' and (ns−nz)d' close to 350 nm, as in Mode 3, is preferably used as the third retardation film 19.

When the s-axis is set almost perpendicular to the absorption axis ha of the adjacent front polarizer, a uniaxial retardation film that satisfies (ns−nz)/(ns−nf)=1 and has values (nd−nf)d' and (ns−nz)d' close to 350 to 440 nm, as in Modes 4 and 6, is preferably used as the third retardation film 19.

In Modes 7, 8, 10, and 12, a biaxial retardation film that satisfies (ns−nz)/(ns−nf)=0.3 and has a value (nd−nf)d' close to 265 to 420 nm and a value (ns−nz)d' close to 80 to 126 nm is preferably used.

In more preferable Modes 8, 10, and 12 of these preferable modes, a biaxial retardation film that has the s-axis set almost perpendicular to the absorption axis 11a of the front polarizer 11, satisfies (ns−nz)/(ns−nf)=0.3, and has retardation with which the value (nd−nf)d' is close to 265 to 420 nm and the value (ns−nz)d' is close to 80 to 126 nm, and more preferably, the value (nd−nf)d' is close to 350 nm and the value (ns−nz)d' is close to 105 nm is used as the third retardation film 19.

The liquid crystal cell 1 used in the above embodiment employs the active matrix scheme. However, the liquid crystal cell 1 may employ a simple matrix scheme in which a plurality of scan electrodes along the row direction are formed on the inner surface of one of the pair of substrates 2 and 3, and a plurality of signal electrodes along the column direction are formed on the inner surface of the other substrate. The liquid crystal cell 1 may display either a monochrome image or a multi-color image by using color filters of a plurality of colors, for example, three colors (red, green, and blue) in correspondence with the plurality of pixel regions.

The liquid crystal display of the above embodiment is a TN-type liquid crystal display in which the liquid crystal molecules of the liquid crystal cell 1 are aligned at a twist angle of about 90°. However, the present invention can also be applied to, e.g., an STN-type liquid crystal display in which liquid crystal molecules are aligned at a twist angle of 180° to 270° (normally 220° to 250°), or homogeneous liquid crystal display. in this case as well, the first and second retardation films are inserted between the liquid crystal cell and the rear and front polarizers, the axial directions are set along the aligning treatment directions of the substrates, and the third retardation film 19 whose refractive indices along the s-, f-, and z-axes have the relationship ns>nz≧nf is inserted between at least one of the first and second retardation film and the adjacent polarizer whereby the residual retardation generated near the substrates in the liquid crystal layer and the retardation difference generated in the liquid crystal layer by the difference in incident angle when light becomes obliquely incident can be compensated.

[Second Embodiment]

FIG. 17 is an exploded perspective view showing a liquid crystal display according to the second embodiment of the present invention. In this embodiment, a third retardation film 19' is inserted between a second retardation film 14 and an adjacent rear polarizer 12. This liquid crystal display is different from that of the first embodiment only in the insertion position of the third retardation film 19'. The same reference numerals as in the first embodiment denote the same parts in the second embodiment, and a detailed description thereof will be omitted.

In the liquid crystal display of the second embodiment, aligning treatment directions 2a and 3a of front substrate 2 and rear substrate 3 of a liquid crystal cell 1, the twist angle of liquid crystal molecules, axial directions N in which the refractive indices of first retardation film 13 and second retardation film 14 are minimized, and the directions of absorption axes 11a and 12a of front polarizer 11 and rear polarizer 12 are the same as in the first embodiment.

The third retardation film 19' inserted between the second retardation film 14 and the rear polarizer 12 has a direction which has refractive index anisotropy in the film plane and in which the refractive index in the film plane is maximized. The direction in which the refractive index in the film plane is maximized is set almost parallel or perpendicular to the absorption axis 12a of the adjacent rear polarizer 12.

In this embodiment as well, for the third retardation film 19', refractive indices ns, nf, and nz of the s-axis along which the refractive index in the film plane is maximized, the f-axis perpendicular to the s-axis in the film plane, and the z-axis in the normal direction to the film plane have a relationship ns>nz≧nf, and preferably, $0<(ns-nz)/(ns-nf) \leq 1$.

In the liquid crystal display of this embodiment, the first and second retardation films 13 and 14 are arranged on the front and rear sides of the liquid crystal cell 1, respectively. In addition, the front polarizer 11 and rear polarizer 12 are arranged outside the first and second retardation films 13 and 14.

The third retardation film 19' is inserted between the second retardation film 14 and the rear polarizer 12.

Incoming light on this liquid crystal display passes through the rear polarizer 12. Then, polarized light oscillating in a direction perpendicular to the absorption axis of the polarizer 12 enters the third retardation film 19' at an angle corresponding to the s-axis along which the refractive index in the film plane is maximized and the incident angle with respect to the normal line to the liquid crystal display. When light comes from the normal direction to the liquid crystal display, the oscillation direction of the polarized light is perpendicular to the s-axis, so the light passes through the third retardation film without changing the oscillation direction. As the incident angle with respect to the normal direction becomes large, the shift from the state in which the oscillation direction of the polarized light is perpendicular to the s-axis becomes large. Hence, elliptically polarized light is incident on the third retardation film 19' and emerges therefrom while having a retardation difference corresponding to the incident angle. A retardation difference newly generated when the light passes through a liquid crystal layer 9 at the same incident angle can be compensated by the retardation difference generated when the light passes through the third retardation film 19'. For this reason, when no voltage is applied to the electrodes sandwiching the liquid crystal layer 9, high transmittance can be obtained independently of the incident angle.

In addition, like the liquid crystal display of the first embodiment, the residual retardation due to the liquid crystal molecules near the substrates 2 and 3 of the liquid crystal layer 9 is compensated by the first and second retardation films 13 and 14. When a voltage is applied to the liquid crystal layer 9, the light that has passed through the rear polarizer 12 oscillates in a direction parallel to the absorption axis 11a of the front polarizer 11 and therefore is absorbed by the absorption axis 11a. For this reason, black display with low transmittance can be obtained.

Hence, in this liquid crystal display, display with high transmittance can be obtained independently of the incident angle of light when no voltage is applied to the electrodes sandwiching the liquid crystal layer, and display with low transmittance can be obtained when a voltage is applied to the electrodes sandwiching the liquid crystal layer, so high-contrast display can be realized in a wide viewing angle range.

[Third Embodiment]

FIG. 18 is an exploded perspective view showing a liquid crystal display according to the third embodiment of the present invention. In this embodiment, third retardation films 19 and 19' are respectively inserted between a first retardation film 13 and a front polarizer 11 and between a second retardation film 14 and a rear polarizer 12. This liquid crystal display is different from that of the first embodiment only in the insertion position of the third retardation film 19'. The same reference numerals as in the first embodiment denote the same parts in the third embodiment, and a detailed description thereof will be omitted.

In the liquid crystal display of the third embodiment, aligning treatment directions 2a and 3a of front substrate 2 and rear substrate 3 of a liquid crystal cell 1, the twist angle of liquid crystal molecules, axial directions N in which the refractive indices of the first retardation film 13 and second retardation film 14 are minimized, and the directions of absorption axes 11a and 12a of front polarizer 11 and rear polarizer 12 are the same as in the first embodiment.

The third retardation film 19 inserted between the first retardation film 13 and the front polarizer 11 is arranged such that the direction which has refractive index anisotropy in the film plane and in which the refractive index in the film plane is maximized is set almost parallel or perpendicular to the absorption axis 11a of the adjacent front polarizer 11.

The third retardation film 19' inserted between the second retardation film 14 and the rear polarizer 12 is arranged such that the direction which has refractive index anisotropy in the film plane and in which the refractive index in the film plane is maximized is set almost parallel or perpendicular to the absorption axis 12a of the adjacent rear polarizer 12.

In this embodiment as well, for each of the third retardation films 19 and 19', refractive indices ns, nf, and nz of the s-axis along which the refractive index in the film plane is maximized, the f-axis perpendicular to the s-axis in the film plane, and the z-axis in the normal direction to the film plane have a relationship $ns > nz \geq nf$, and preferably, $0 < (ns-nz)/(ns-nf) \leq 1$.

In the liquid crystal display of this embodiment, the first and second retardation films 13 and 14 are arranged on the front and rear sides of the liquid crystal cell 1, respectively. In addition, the front polarizer 11 and rear polarizer 12 are arranged outside the first and second retardation films 13 and 14. The third retardation film 19 is inserted between the first retardation film 13 and the front polarizer 11. The third retardation film 19' is inserted between the second retardation film 14 and the rear polarizer 12. Hence, like the liquid crystal display of the first embodiment, the residual retardation due to the liquid crystal molecules near the substrates 2 and 3 of a liquid crystal layer 9 is compensated by the first and second retardation films 13 and 14. When a voltage is applied to the electrodes sandwiching the liquid crystal layer 9, light that has passed through the rear polarizer 12 oscillates in a direction parallel to the absorption axis 11a of the front polarizer 11 and therefore is absorbed by the absorption axis 11a. For this reason, black display with low transmittance can be obtained.

For this liquid crystal display, the refractive indices in the ns, nf, and nz-axis directions and film thickness d' of each of the third retardation films 19 and 19' are set such that the retardation difference generated in correspondence with the incident angle from the normal direction to the liquid crystal display when light passes through the liquid crystal layer 9 is compensated by the retardation difference generated when the light passes through a corresponding one of the third retardation films 19 and 19' located in front and rear sides of the liquid crystal cell 1. With this arrangement, when a voltage is applied to electrodes 5 and 6 sandwiching the liquid crystal layer 9, display with high transmittance can be obtained independently of the incident angle of light.

More specifically, light incident on this liquid crystal display passes through the rear polarizer 12. Then, polarized light oscillating in a direction perpendicular to the absorption axis of the polarizer 12 becomes incident on the third retardation film 19' at an angle corresponding to the s-axis and the incident angle. When light arrives from the normal direction to the liquid crystal display, the oscillation direction of the polarized light is perpendicular to the s-axis, so the light passes through the third retardation film without changing the oscillation direction. As the incident angle with respect to the normal direction becomes large, the shift from the state in which the oscillation direction of the polarized light is perpendicular to the s-axis becomes large. Hence, elliptically polarized light is incident on the third retardation film 19' and emerges therefrom while having a retardation difference corresponding to the incident angle.

A retardation difference generated in correspondence with the incident angle with respect to the normal direction when light passes through the liquid crystal layer 9 is compensated by the retardation difference generated when the light passes through the third retardation film 19' obliquely with respect to the normal direction and that generated by the elliptically polarized light when the light passes through the third retardation film 19 arranged on the front side of the liquid crystal cell 1, as described for the liquid crystal display of the first embodiment.

Hence, in this liquid crystal display, display with high transmittance can be obtained independently of the incident angle of light when no voltage is applied to the electrodes 5 and 6 sandwiching the liquid crystal layer 9, and display with low transmittance can be obtained when a voltage is applied to the electrodes 5 and 6 sandwiching the liquid crystal layer 9, so high-contrast display can be realized in a wide viewing angle range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display comprising:
   a liquid crystal cell having alignment films formed on inner surfaces of a pair of front and rear substrates opposing each other, respectively, so as to be aligned in predetermined directions, and a liquid crystal layer formed between the pair of substrates;
   a pair of polarizers arranged on the front side as an observation side of said liquid crystal cell and the rear side as an opposing side, respectively, so as to have absorption axes making predetermined angles with aligning treatment directions of the alignment films formed on the adjacent substrates;
   a first retardation film inserted between said liquid crystal cell and said polarizer on the front side of said liquid crystal cell so as to have an axial direction, in which a refractive index is minimized, in a direction tilted in a predetermined direction with respect to a normal line to a film plane, and a direction component along the film plane in the axial direction, which is set along the direction of the aligning treatment of the alignment film formed on the substrate on the front side of said liquid crystal cell;
   a second retardation film inserted between said liquid crystal cell and said polarizer on the rear side of said liquid crystal cell so as to have an axial direction, in which a refractive index is minimized, in a direction tilted in a predetermined direction with respect to a normal line to a film plane of the second retardation film, and a direction component along the film plane in the axial direction, which is set along the direction of the aligning treatment of the alignment film formed on the substrate on the rear side of said liquid crystal cell; and
   a third retardation film having refractive index anisotropy in a film plane and arranged in at least one of a position between said first retardation film and the front polarizer and a position between said second retardation film and said rear polarizer so as to have a direction in which a refractive index in the film plane is maximized is substantially parallel or perpendicular to the absorption axis of said adjacent polarizer.

2. A display according to claim 1, wherein each of said first and second retardation films comprises a discotic liquid crystal layer in which liquid crystal molecules are aligned to gradually rise from an aligned state along one surface, from the one surface toward the other surface of said film, and has the axial direction, in which the refractive index is minimized, in a direction along an average molecular axis direction of discotic liquid crystal molecules in an intermediate direction in a direction of thickness of said discotic liquid crystal layer, and the direction component along the film plane in the axial direction of each of said first and second retardation films is set parallel to the direction of the aligning treatment of the corresponding adjacent substrate.

3. A display according to claim 2, wherein
   said liquid crystal cell in which the direction of aligning treatment of the alignment film formed on the front substrate is perpendicular to that of the alignment film formed on the rear substrate has the twisted liquid crystal layer sandwiched by the substrate,
   said pair of polarizers have the absorption axes parallel to the direction of aligning treatment of the alignment films formed on the adjacent substrates of said liquid crystal cell; and
   said third retardation film has the direction in which the refractive index is maximized in substantially parallel to the absorption axis of said adjacent polarizer.

4. A display according to claim 3, wherein said third retardation film is arranged between said front polarizer and said first retardation film.

5. A display according to claim 3, wherein said third retardation film is arranged between said rear polarizer and said second retardation film.

6. A display according to claim 3, wherein said third retardation films are respectively arranged both between said front polarizer and said first retardation film and between said rear polarizer and said second retardation film.

7. A display according to claim 3, wherein for said third retardation film, if an s-axis represents the direction in which the refractive index is maximized in the film plane of the third retardation film, an f-axis represents a direction perpendicular to the s-axis in the film plane, and a z-axis represents a normal direction to the film plane, letting ns be a refractive index along the s-axis, nf be a refractive index along the f-axis, and nz be a refractive index along the z-axis, the refractive indices satisfy
   a relationship $0 < (ns-nz)/(ns-nf) \leq 1$.

8. A display according to claim 7, wherein a value of a product $\Delta nd$ of a birefringence index and liquid crystal layer thickness $\underline{d}$ of said liquid crystal cell falls within a range of 300 to 500 nm, and letting d' be a thickness of said third retardation film, said third retardation film has retardation with which
   a value $(ns-nf) \cdot d'$ falls within a range of 250 to 450 nm, and
   a value $(ns-nz) \cdot d'$ falls within a range of 70 to 450 nm.

9. A display according to claim 2, wherein
   said liquid crystal cell in which the direction of aligning treatment of the alignment film formed on the front substrate is perpendicular to that of the alignment film formed on the rear substrate has the twisted liquid crystal layer sandwiched by the substrate, said pair of polarizers have the absorption axes parallel to the direction of aligning treatment of the alignment films formed on the adjacent substrates of said liquid crystal cell; and said third retardation film has the direction in which the refractive index in the film plane is maximized in substantially perpendicular to the absorption axis of said adjacent polarizer.

10. A display according to claim 9, wherein said third retardation film is arranged between said front polarizer and said first retardation film.

11. A display according to claim 9, wherein said third retardation film is arranged between said rear polarizer and said second retardation film.

12. A display according to claim 9, wherein said third retardation films are respectively arranged between said front polarizer and said first retardation film and between said rear polarizer and said second retardation film.

13. A display according to claim 9, wherein for said third retardation film, if an s-axis represents the direction in which the refractive index is maximized in the film plane, an f-axis represents a direction perpendicular to the s-axis in the film plane, and a z-axis represents a normal direction to the film plane, letting ns be a refractive index along the s-axis, nf be a refractive index along the f-axis, and nz be a refractive index along the z-axis, the refractive indices satisfy a relationship $0<(ns-nz)/(ns-nf)\leq 1$.

14. A display according to claim 13, wherein a value of a product $\Delta nd$ of a birefringence index and liquid crystal layer thickness $\underline{d}$ of said liquid crystal cell falls within a range of 300 to 500 nm, and letting d' be a thickness of said third retardation film, said third retardation film has retardation with which a value $(ns-nf)\cdot d'$ falls within a range of 250 to 450 nm, and a value $(ns-nz)\cdot d'$ falls within a range of 70 to 450 nm.

* * * * *